(12) United States Patent
Senff

(10) Patent No.: US 11,918,530 B2
(45) Date of Patent: Mar. 5, 2024

(54) COUNTERTOP WATER FLOSSER

(71) Applicant: WATER PIK, INC., Fort Collins, CO (US)

(72) Inventor: Oscar C. Senff, Broomfield, CO (US)

(73) Assignee: WATER PIK, INC., Fort Collins, CO (US)

( * ) Notice: Subject to any disclaimer, the term of this patent is extended or adjusted under 35 U.S.C. 154(b) by 884 days.

(21) Appl. No.: 16/797,621

(22) Filed: Feb. 21, 2020

(65) Prior Publication Data

US 2020/0268494 A1  Aug. 27, 2020

Related U.S. Application Data

(60) Provisional application No. 62/809,466, filed on Feb. 22, 2019.

(51) Int. Cl.
*A61H 13/00* (2006.01)
*A61C 17/02* (2006.01)

(52) U.S. Cl.
CPC ....... *A61H 13/005* (2013.01); *A61C 17/0202* (2013.01); *A61C 17/0205* (2013.01)

(58) Field of Classification Search
CPC .............. A61H 13/005; A61C 17/0202; A61C 17/0205; A61C 17/02; A61C 17/0211; A61C 17/024; A61C 17/028
See application file for complete search history.

(56) References Cited

U.S. PATENT DOCUMENTS

| | | |
|---|---|---|
| 3,666,180 A | 5/1972 | Coombs et al. |
| 4,141,352 A | 2/1979 | Ebner et al. |
| 4,266,535 A | 5/1981 | Moret |
| 5,197,458 A | 3/1993 | Ito et al. |
| 5,476,379 A | 12/1995 | Disel |

(Continued)

FOREIGN PATENT DOCUMENTS

| | | | | |
|---|---|---|---|---|
| CN | 2189167 Y | * | 2/1995 | ............. Y02A 20/00 |
| CN | 102101609 | | 6/2011 | |

(Continued)

OTHER PUBLICATIONS

Machine Translation of CN-102101609-A, Kino, Jun. 2011. (Accessed Jan. 4, 2023) Year: 2023.*

(Continued)

*Primary Examiner* — Kendra D Carter
*Assistant Examiner* — Maap Ahmed Ellabib
(74) *Attorney, Agent, or Firm* — Dorsey & Whitney LLP

(57) ABSTRACT

A water flosser is provided that may include a base, a reservoir positioned above the base, a lid, and a handle in fluid communication with the reservoir such as by a hose. The reservoir of the water flosser may include a recess formed in a reservoir wall for receipt of a hose support structure. An input device (e.g., a power button) may be positioned adjacent an upper portion of the water flosser, such as in or adjacent the lid. Actuation of the input device may include application of a force downward toward the base. The water flosser may include a motor having a dual output shaft, with one end of the shaft being associated with a rotary encoder or other sensing device to determine an operational characteristic of the motor. The motor may be driven by a power source such as a rechargeable battery.

20 Claims, 15 Drawing Sheets

(56) References Cited

U.S. PATENT DOCUMENTS

| | | | |
|---|---|---|---|
| 5,799,126 A | 8/1998 | Nagatani et al. | |
| 6,007,225 A | 12/1999 | Ramer et al. | |
| 6,247,929 B1 | 6/2001 | Bachman et al. | |
| 6,288,352 B1 | 9/2001 | Fukui et al. | |
| 7,244,898 B2 * | 7/2007 | Kim | H01H 13/83 |
| D601,694 S | 10/2009 | Rocklin | |
| 7,692,111 B1 * | 4/2010 | Rosing | H01H 13/83 200/310 |
| 8,367,954 B2 | 2/2013 | Mao et al. | |
| D764,051 S | 8/2016 | Wang | |
| 9,468,511 B2 | 10/2016 | Garrigues et al. | |
| 9,642,577 B1 | 5/2017 | Li et al. | |
| D796,028 S | 8/2017 | Senff et al. | |
| D797,278 S | 9/2017 | Uchida | |
| D804,018 S | 11/2017 | Senff et al. | |
| D822,825 S | 7/2018 | Au et al. | |
| 10,010,389 B2 | 7/2018 | Boyd et al. | |
| 10,016,254 B2 | 7/2018 | Luettgen | |
| 10,022,207 B2 | 7/2018 | Taylor et al. | |
| D829,887 S | 10/2018 | Massie et al. | |
| D833,000 S | 11/2018 | Porter et al. | |
| D833,600 S | 11/2018 | Porter et al. | |
| D834,180 S | 11/2018 | Porter et al. | |
| 10,130,452 B2 | 11/2018 | Baragona et al. | |
| D839,409 S | 1/2019 | Massie et al. | |
| D840,022 S | 2/2019 | Porter et al. | |
| D840,023 S | 2/2019 | Massie et al. | |
| D889,636 S | 7/2020 | Senff et al. | |
| D912,241 S | 3/2021 | Senff et al. | |
| D913,485 S | 3/2021 | Senff et al. | |
| 2006/0108210 A1 | 5/2006 | Katayama et al. | |
| 2007/0203439 A1 | 8/2007 | Boyd et al. | |
| 2009/0188780 A1 | 7/2009 | Watanabe | |
| 2010/0110722 A1 * | 5/2010 | Sin | H01H 13/023 |
| 2010/0239998 A1 | 9/2010 | Snyder et al. | |
| 2011/0016721 A1 | 1/2011 | Schnak et al. | |
| 2011/0036693 A1 | 2/2011 | Lin et al. | |
| 2011/0070553 A1 | 3/2011 | Stempfle et al. | |
| 2012/0045730 A1 | 2/2012 | Sayder et al. | |
| 2013/0101953 A1 | 4/2013 | Stone et al. | |
| 2014/0063836 A1 | 3/2014 | Chiang et al. | |
| 2014/0272782 A1 | 9/2014 | Luettgen et al. | |
| 2014/0328067 A1 | 11/2014 | Chu et al. | |
| 2015/0147717 A1 | 5/2015 | Taylor et al. | |
| 2015/0173850 A1 | 6/2015 | Garrigues et al. | |
| 2015/0182319 A1 | 7/2015 | Wagner et al. | |
| 2015/0332872 A1 | 11/2015 | Konishi | |
| 2017/0045666 A1 | 2/2017 | Vasylyev | |
| 2017/0052436 A1 | 2/2017 | Xian | |
| 2017/0056142 A1 | 3/2017 | Baragona et al. | |
| 2017/0209234 A1 | 7/2017 | Senff et al. | |
| 2017/0252251 A1 | 9/2017 | Williams et al. | |
| 2018/0000557 A1 | 1/2018 | Brandstaetter et al. | |
| 2018/0140398 A1 | 5/2018 | Hoshino et al. | |
| 2018/0140399 A1 | 5/2018 | Hoshino et al. | |
| 2018/0140400 A1 | 5/2018 | Hoshino et al. | |
| 2018/0140401 A1 * | 5/2018 | Hoshino | A61C 17/14 |
| 2018/0153644 A1 | 6/2018 | Bosisio et al. | |
| 2018/0168332 A1 | 6/2018 | Wagner et al. | |
| 2018/0168784 A1 | 6/2018 | Wagner et al. | |
| 2018/0168785 A1 | 6/2018 | Wagner et al. | |
| 2018/0256300 A1 | 9/2018 | Hoshino et al. | |
| 2021/0213766 A1 | 7/2021 | Lim et al. | |
| 2021/0338376 A1 | 11/2021 | Senff et al. | |

FOREIGN PATENT DOCUMENTS

| | | | |
|---|---|---|---|
| CN | 102101609 A * | 6/2011 | B65H 54/44 |
| CN | 202776618 | 3/2013 | |
| CN | 105338924 | 2/2016 | |
| CN | 105338924 A * | 2/2016 | A61C 1/0015 |
| CN | 105640662 A | 6/2016 | |
| CN | 106890033 A | 6/2017 | |
| CN | 108618861 A | 10/2018 | |
| CN | 109009523 | 12/2018 | |
| DE | 3936714 A1 | 5/1991 | |
| EP | 2229917 A1 | 9/2010 | |
| EP | 3323381 A1 | 5/2018 | |
| EP | 3323382 A1 | 5/2018 | |
| EP | 3323383 A1 | 5/2018 | |
| EP | 3323384 A1 | 5/2018 | |
| EP | 3357454 A1 | 8/2018 | |
| EP | 3372195 A1 | 9/2018 | |
| JP | 2018073458 A | 5/2018 | |
| KR | 20080055789 A * | 6/2008 | G06F 11/008 |
| KR | 20120004128 A | 1/2012 | |
| KR | 20150025688 A | 3/2015 | |
| KR | 20180110421 | 10/2018 | |
| TW | 200829123 A | 7/2008 | |
| WO | 2006074525 A1 | 7/2006 | |
| WO | 2010021284 A1 | 2/2010 | |
| WO | 2016018149 A1 | 2/2016 | |
| WO | 2017046945 A1 | 3/2017 | |
| WO | 2018112387 | 6/2018 | |
| WO | WO-2018112387 A1 * | 6/2018 | A46B 15/0095 |

OTHER PUBLICATIONS

Machine Translation of CN-105338924-A, Baragona, Jun. 2016. (Accessed Jan. 4, 2023) Year: 2023.*

Machine Translation of KR-20080055789-A, Hosek, Jun. 2008. (Accessed Jan. 4, 2023) Year: 2023.*

Machine Translation of CN-2189167 Y, Ji., Feb., 1995 (Accessed Jan. 4, 2023) Year: 2023.*

International Search Report and Written Opinion dated Aug. 7, 2020, in PCT Application No. PCT/US2020/019288, 16 pages.

* cited by examiner

COUNTERTOP WATER FLOSSER

CROSS REFERENCE TO RELATED APPLICATIONS

The present application claims priority to U.S. provisional application No. 62/809,466 entitled "Countertop Water Flosser," filed on Feb. 22, 2019, which is hereby incorporated herein in its entirety for all purposes.

TECHNICAL FIELD

The present disclosure relates to health and personal hygiene equipment and methods of controlling such equipment. More particularly, the present disclosure relates to water flossers and methods of controlling such equipment.

BACKGROUND

Water flossers, also referred to as oral irrigators, may be used to clean a user's teeth and gums by discharging a pressurized pulsating fluid stream into a user's oral cavity. The fluid impacts the teeth and gums to remove debris. Some water flossers allow a user to alter the pressure or fluid flow rate from the flosser. Altering the pressure level enables a user to tailor the flossing experience to ones needs and personal preferences.

Water flossers may come in a variety of configurations including countertop models that are powered by an AC outlet and handheld models that are battery powered and are self-contained, meaning that all components, including the reservoir, are contained in, or are immediately associated with, the handle. Different configurations provide different advantages.

SUMMARY

The present disclosure provides embodiments of a water flosser including various components and features associated with water flossers. In accordance with one embodiment, a water flosser may include a base, a reservoir positioned over the base and a lid positioned over the reservoir. An input device may be positioned above the base, wherein the input device is configured to be actuated upon application of a force in a downward direction toward the base. In some embodiments, the input device may be positioned adjacent a surface of the lid and configured to be actuated upon application of a force in a downward direction toward the base. In these embodiments, the input device may include a power button and/or a ring surrounding the power button.

In some instances, the water flosser may include a light source and a light pipe extending between the light source and the light ring to transmit light from the light source to the light ring. The input device may be associated with a riser adjacent the reservoir of the water flossing device.

In various embodiments, the water flosser may include an input device coplanar with the lid.

In various embodiments, the reservoir of the water flosser may define an interior cavity having first, second, third, and forth interior corners, where the first, second and third interior corners are concave and the fourth interior corner is convex. In some instances, a riser, such as for an input device, may be positioned adjacent the fourth corner.

In various embodiments, the water flosser may include at least one of a push rod, a conductive trace, or a wireless transmitting device coupled with the input device and a controller disposed in the base.

The water flosser embodiments described herein may include a handle in fluid communication with the reservoir, a hose in fluid communication with the handle, and a hose support structure associated with the base and extending into a recess formed in a wall of the reservoir.

In various embodiments, the water flosser may include a pump disposed in the base and in fluid communication with the reservoir and a motor disposed in the base and including a dual output shaft having a first shaft end coupled with the pump and a second shaft end coupled with a sensor configured to determine a rotational speed of the motor. In some instances, the water flosser may include a pump disposed in the base and in fluid communication with the reservoir and a motor disposed in the base and including a dual output shaft having a first shaft end coupled with the pump and a second shaft end coupled with a sensor configured to determine a rotational speed of the motor.

In some embodiments, the water flosser may include a piston and a pump body disposed in the base. The pump body includes a fluid inlet in fluid communication with the reservoir, a fluid outlet in fluid communication with the fluid inlet, and a piston chamber in fluid communication with the fluid inlet and the fluid outlet. In these embodiments, the piston is at least partially received within and move relative to the piston chamber and the piston chamber, the fluid inlet, and the fluid outlet are all oriented orthogonal to one another.

In an embodiment, the water flosser may include an electronics carrier disposed in the base, a light emitting diode mounted to a top surface of the electronics carrier for detecting and output speed of a motor disposed in the base.

In another embodiment, a method for controlling power to a water flosser including locating a power button associated with a lid of the water flosser and pressing downward on the power button to actuate the power button and power the water flosser. In some embodiments, the power button may be coplanar with the lid and/or may be located adjacent to the lid.

In accordance with another embodiment, a water flosser may include a base, a reservoir, and a handle in fluid communication with the reservoir. A pump may be disposed in the base and in fluid communication with the reservoir and the handle. A motor may be disposed in the base wherein the motor includes a dual output shaft having a first shaft end coupled with the pump and a second shaft end coupled with a sensing device configured to determine an operational parameter of the motor. In some embodiments, the operational parameter may include the speed of the motor. In some embodiments, the sensing device includes a rotary encoder disc coupled with the second shaft end. In some instances, the rotary encoder disc may define a plurality of cutouts where the water flosser includes a transmitter positioned on a first side of the rotary encoder disc and a receiver positioned on a second side of the rotary encoder disc. The transmitter may be light or photo sensitive, such as a photo sensor.

In accordance with a further embodiment, a water flosser may include a base, a reservoir, a handle in fluid communication with the reservoir by way of a hose, and a hose support structure coupled with the base. The hose support structure may extend into a recess formed in a wall of the reservoir. In various embodiments, the pump and motor may be disposed on the base and the motor may include a shaft coupled with the pump by way of one or more gear members. In some embodiments, the reservoir includes a second recess formed in a floor of the reservoir and a portion of the one or more gear members extending into the second recess.

In accordance with yet another embodiment a reservoir for a water flosser is provided. The reservoir may include a first wall, a second wall, a third wall, a fourth wall and a floor defining an inner cavity. The first wall, second wall, third wall and forth wall may be joined together to define a first corner, a second corner, a third corner and a fourth corner. A recess may additionally be formed in the first wall and extending into the inner cavity. In various embodiments, the first, second, and third corners are interior concave corners and the fourth corner is an interior convex corner. In some embodiments, the second recess is formed in the floor and extends into the inner cavity.

In various embodiments, an oral irrigator is disclosed that includes a handle, a reservoir, a base fluidly connected to the reservoir and the handle, and a pump assembly positioned within the base and in fluid communication with the reservoir and the handle. In some embodiments, the pump assembly may include a piston and a pump body positioned within the base, where the pump body includes a fluid inlet in fluid communication with the reservoir, a fluid outlet in fluid communication with the fluid inlet, and a piston chamber in fluid communication with the fluid inlet and the fluid outlet, where the piston is at least partially received within and moves relative to the piston chamber and the piston chamber, the fluid inlet, and the fluid outlet are all oriented orthogonal to one another.

In various embodiments, the oral irrigator may include a hose connected to the handle and a hose connector connected to the hose and to a fluid outlet of the pump body, where the fluid outlet directs fluid out of a bottom surface of the base.

In an embodiment, an oral irrigator including a reservoir, a handle fluidly coupled to the reservoir, a housing supporting the reservoir and defining a housing compartment, and an electronics carrier positioned within the housing compartment and elevated above a bottom interior surface of the housing, where the electronics carrier includes one or more electrical components of the oral irrigator. In various embodiments, the oral irrigator may further include a motor and pump where the motor is positioned at least partially between the electronics carrier and the bottom interior surface of the housing and the motor drives the pump to pump fluid from the reservoir to the handle. In some embodiments, the motor and the pump are oriented at a right angle to one another. The oral irrigator may also include a sensor to detect an output speed of the motor and the sensor can be mounted to the electronics carrier, for example to a bottom of the electronics carrier. The oral irrigator may include a button for activating the motor and a light emitting diode configured to illuminate a button or an area around the button. The light emitting diode may be mounted to a top surface of the electronics carrier.

In various embodiments, the oral irrigator may include a battery electrically connected to the motor where the electronics carrier is positioned over the battery. In some embodiments, the electronics carrier may be a printed circuit board and a top surface of the printed circuit board and a bottom surface of the printed circuit board extend parallel to a bottom interior surface of the housing.

In some embodiments, a countertop oral cleansing device is disclosed that includes a base, a reservoir positioned on the base, a lid coupled to the reservoir to cover an opening of the reservoir, and an input device assembly connected to the base and oriented in a plane aligned with the lid. In various embodiments, at least two sidewalls of the input device assembly abut sidewalls of the lid. In some embodiments, the input device assembly may include a button, push rod, and switch, where movement of the button in a first direction towards the base activates the push rod to change a state of the switch.

In various embodiments, a switch associated with an input button for the oral irrigator may be supported within the base on a circuit board separated from the button. The circuit board in some instances may be elevated above a bottom interior surface of the base. In some embodiments, the oral irrigator may include a motor, a battery, and the circuit board may be positioned over at least one of the motor or the battery.

While multiple examples are disclosed, still other examples of the present disclosure will become apparent to those skilled in the art from the following detailed description, which shows and describes illustrative examples of the disclosure. As will be realized, the disclosure is capable of modifications in various aspects, all without departing from the spirit and scope of the present disclosure. Accordingly, the drawings and detailed description are to be regarded as illustrative in nature and not restrictive.

DETAILED DESCRIPTION

Figure 1:
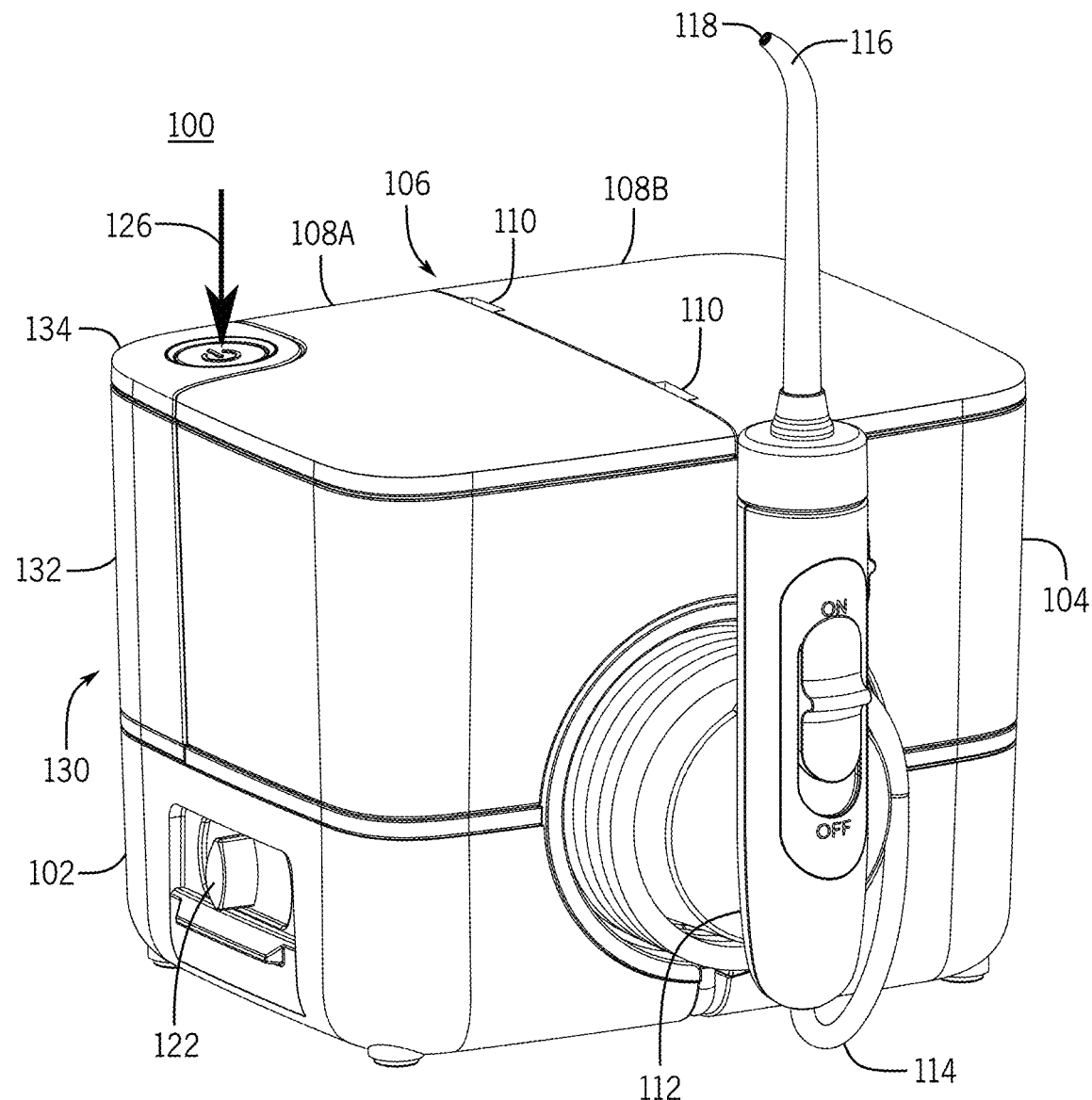
FIG. 1 is a front perspective view of water flosser according to an embodiment of the present disclosure.

Some examples of the present disclosure include a water flosser (which may also be referred to as an oral irrigator or oral cleansing device). The water flosser may be configured as a countertop device and may be line powered or battery powered. The water flosser may include various features to enhance stability of the device, improve the ease of operation, and enhance operation of the device.

In some embodiments, the water flosser may include a base, a reservoir positioned on the base, and a lid covering the reservoir. A pump, which may be driven by a motor, is fluidly coupled to the reservoir, such as by one or more valves and appropriate conduits and tubing. A handle having a tip with an outlet may be coupled with the pump such that the pump delivers water or other fluid through the tip at a desired pressure, flow rate, pulse frequency or other characteristic.

In some embodiments, the water flosser may be configured as a countertop model and may be configured to be a cordless model (e.g., having a rechargeable battery powering the motor) or may be a corded model. The water flosser may be configured such that a power button or other operational input device or assembly is positioned in or adjacent to an upwardly facing surface and, further, may be configured so that actuation of the button or input device includes imposing a force on the button or input device in a direction that exhibits a downward vector, toward a supporting surface (e.g., toward a supporting countertop) or towards the base. For example, in some embodiments, the input device may be positioned in, or adjacent to, an uppermost surface or uppermost element (e.g., lid) of the water flosser.

In some embodiments, a riser may extend upwards from a base portion of the water flosser to an upper surface (e.g., a lid) and house a power button or other input device. The riser may include electrical components, mechanical components, lighting components, or some combination of all of the components. In some embodiments, the riser may be located at an outer periphery of the reservoir. In other embodiments, the riser may extend through an inner cavity defined by the reservoir. In some embodiments, rather than a riser housing an input device, electrical traces or wires may be formed in a portion of the reservoir and extend to an input device formed in or otherwise coupled with the lid. In yet other embodiments, an input device may be formed in, or otherwise coupled with the lid and communicate with the controller by way of radio frequency (RF) communication such as Bluetooth® or other appropriate protocols. In other embodiments, communication between an input device and a switch or controller may be effected through the use of light (e.g., through use of optical fibers, light pipes, etc.).

In some embodiments, a controller may be used to control motor speed to alter the pressure or flow rate of fluid flowing through the outlet of the handle tip. For example, a motor may include a double output motor (e.g., two shafts or shaft ends at opposing ends of the motor) or including a feedback shaft, with a drive gear coupled to one shaft or shaft end to drive the associated pump and with a rotary encoder coupled to the second shaft or shaft end. A photo interrupter may be positioned adjacent the rotary encoder and configured to determine the speed of the motor. The speed of the motor may then be controlled in accordance with appropriate design parameters to control the output of fluid. In other embodiments, other types of encoders or sensors may be used to monitor and control the speed of the motor and, thus, the output of the pump.

The water flosser may include a hose support portion about which the hose (which extends from the pump to the handle) may be coiled for storage purposes. In some embodiments the reservoir may be configured to include a recess such that the hose support may be recessed or positioned back into the housing, making the overall footprint of the water flosser smaller while also improving the stability of the water flosser by altering its center of gravity.

In some embodiments, the water flosser may include a compact form factor and include a pump body configured to have a reduced area. For example, the pump body may define a pump inlet, a piston or pump chamber, and a pump outlet, where the pump chamber is oriented orthogonally to the pump outlet and/or the pump inlet. Additionally, the pump inlet may be configured to direct fluid out of a bottom surface of the base and to connect with a hose connector that secures a hose of the handle to the pump body.

In some instances, the water flosser may include an electronics carrier, such as a printed circuit board or a circuit board, that is received within the base or housing. The electronics carrier may be mounted within the base so as to be raised above or elevated from a bottom interior surface of the base, helping to prevent damage from water that may egress into the base or housing. In some instances, the electronics carrier is mounted horizontally such that top and bottom surfaces (e.g., the coupling surfaces) of the electronics carrier extend parallel to the bottom interior surface of the base. One or more electrical components, such as light sources, controllers, and/or sensors may be mounted to the electronics carrier. As an example, a motor sensing device may be mounted to a bottom surface of the electronics carrier and positioned adjacent to and partially over a motor component (e.g., an output shaft) tracked via the sensing device. As another example, a light source, such as a light emitting diode, may be positioned on a top surface of the electronics carrier so as to direct light upwards towards a button or other input assembly for the water flosser, e.g., to illuminate the button or portions thereof.

In some embodiments, these features and components may be included in a water flosser to the exclusion of some, or all, of the others. In some embodiments, any or all of these features and components may be combined together without limitation.

Figure 2:
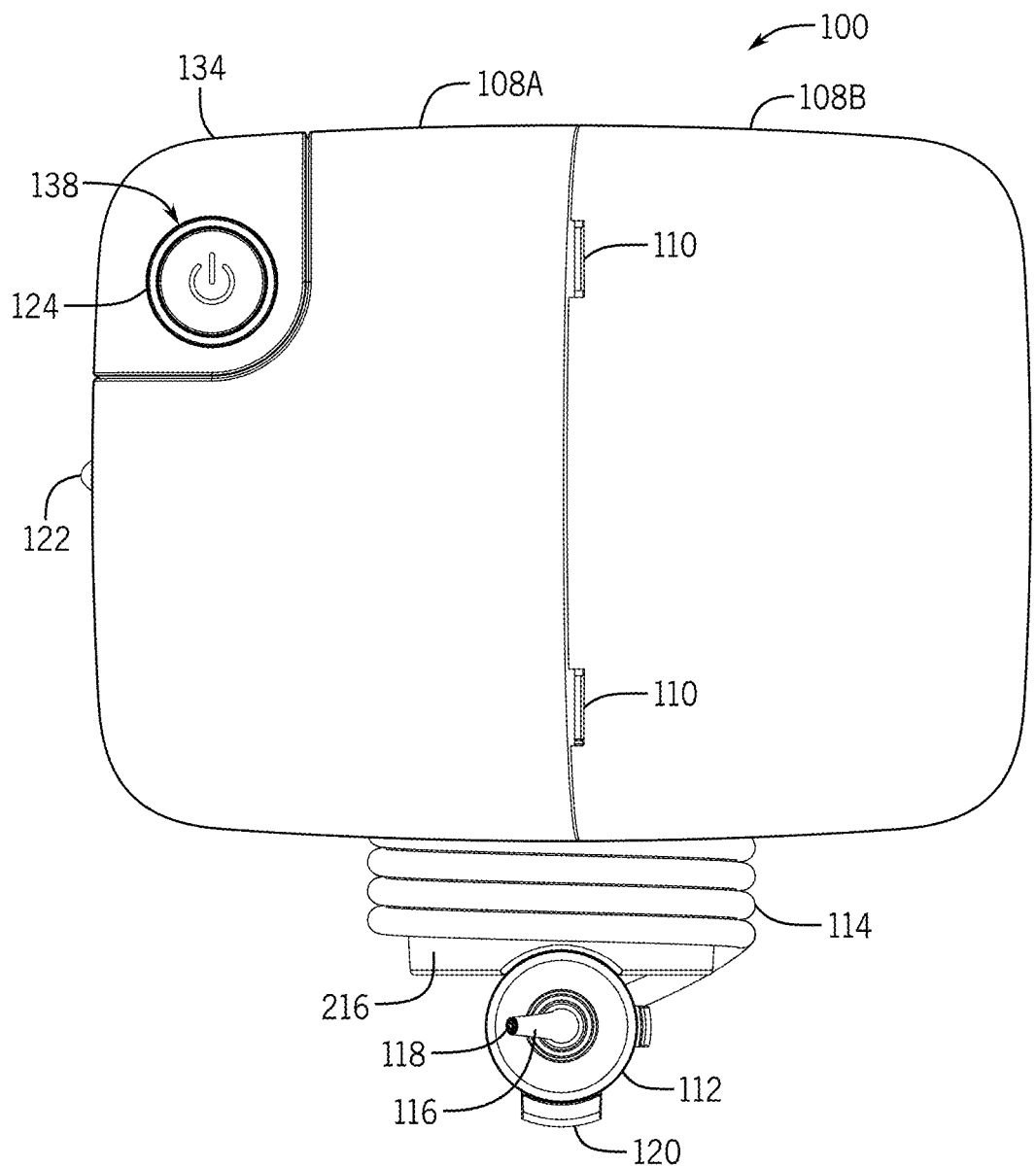
FIG. 2 is a top view of the water flosser of FIG. 1.
Figure 3:
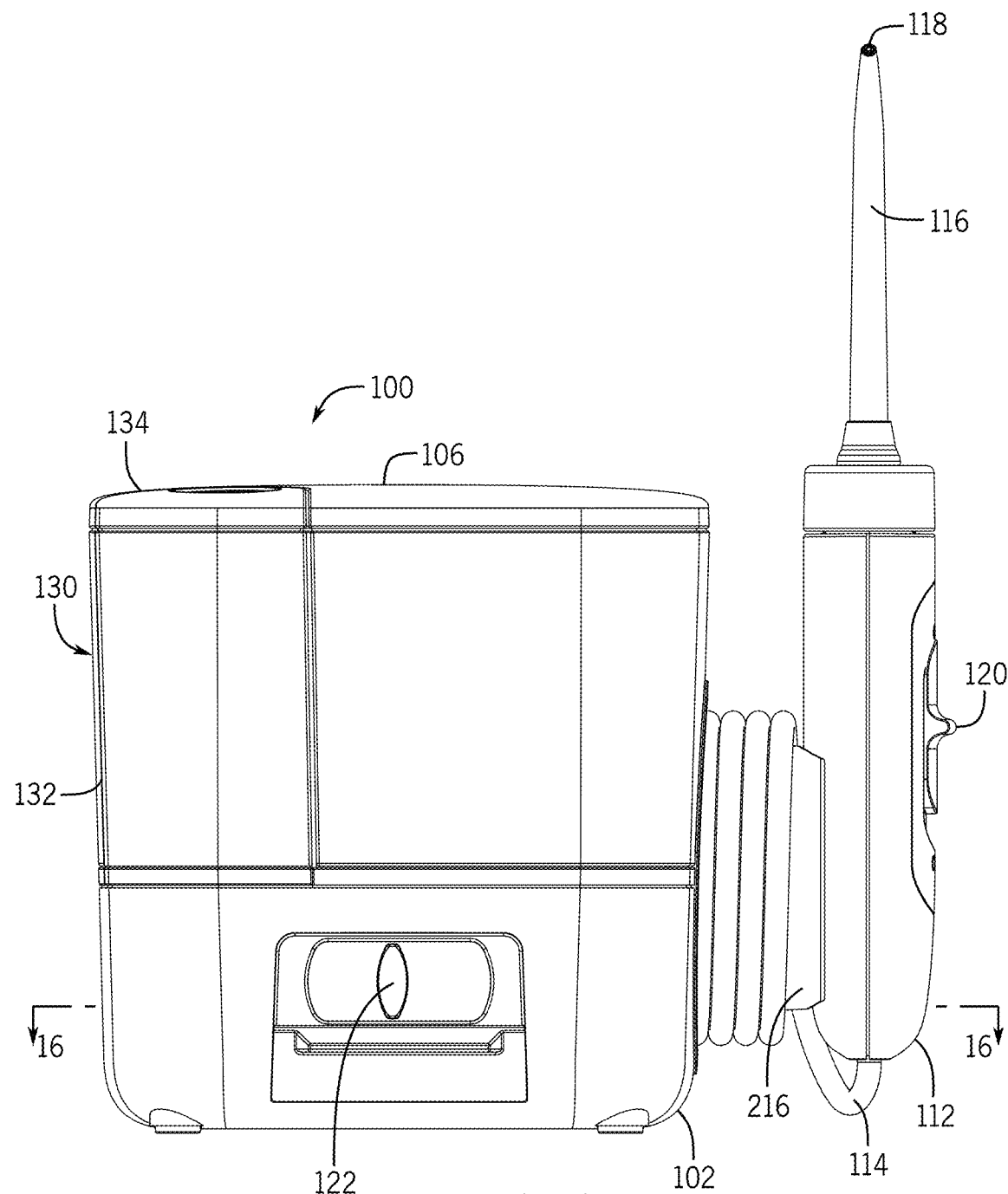
FIG. 3 is a left side view of the water flosser of FIG. 1.
Figure 4:
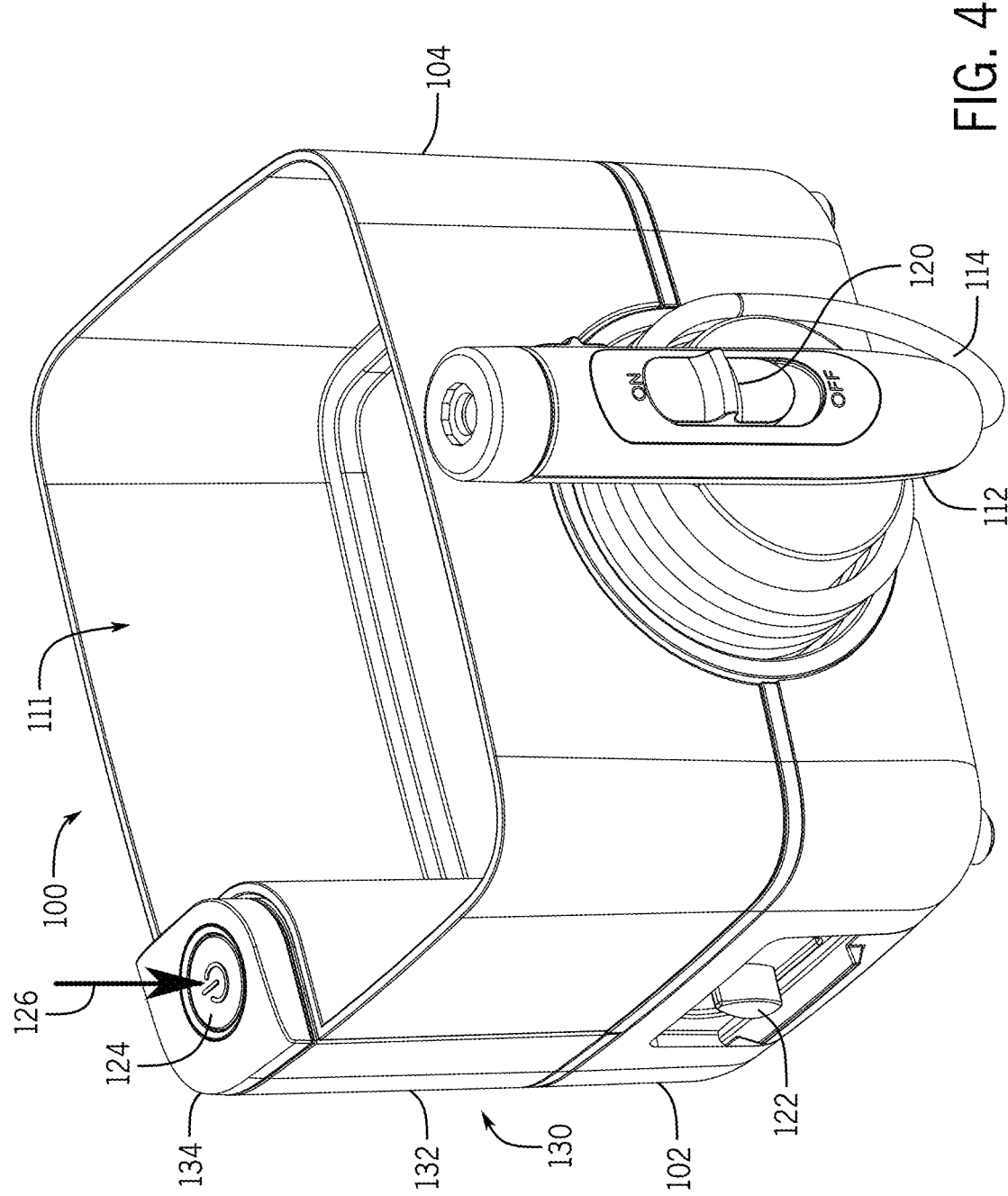
FIG. 4 is a front perspective view of water flosser shown in FIG. 1 with the lid removed.

With reference now to the figures, an example water flosser will be discussed in more detail. FIG. 1 is a front perspective view of water flosser including various features and components according to an embodiment of the present disclosure. FIG. 2 is a top view of the water flosser of FIG. 1, FIG. 3 is a left side view of the water flosser of FIG. 1, and FIG. 4 is a front perspective view of water flosser shown in FIG. 1 with the lid removed.

With initial reference to FIGS. 1-4, the water flosser 100 may include a base 102 or housing, a reservoir 104 positioned over the base 102, and a lid 106 positioned over the reservoir 104. The lid 106 may include multiple portions 108A and 108B that are coupled to each other by way of hinges 110. Thus, in some embodiments, a first portion 108A may be coupled to the reservoir 104 with the second portion 108B being rotatably movable relative to the first portion 108A and the reservoir 104 providing access for a user to fill the inner cavity 111 of the reservoir 104 with water or other fluid. In some embodiments, the entire cover 106 (including both portions 108A and 108B) may be removed from the reservoir for cleaning, storage or other purposes.

The water flosser 100 may include a handle 112 fluidly coupled with a first end of a hose 114, the hose 114 having a second end being fluidly coupled with a pump (positioned in the base 102 and not shown in FIGS. 1-4). A tip 116 is coupled with the handle 114 and includes an outlet 118 through which water, supplied by the pump from the reservoir 104, passes during operation of the water flosser 100. The handle 112 may include a pause actuator 120 such as an ON/OFF switch or other actuator to control the flow of fluid through the outlet 118 during operation of the water flosser 100.

Additional input devices or actuators may also be associated with the water flosser 100. For example, a sliding actuator 122 may be located on the base 102 to control the speed of the motor (housed in the base 102 and not shown in FIGS. 1-4) thereby altering the pressure of the fluid, the flow rate of the fluid, the pulse rate of the fluid, or some combination of these flow characteristics.

The water flosser 100 may include a user input actuator, device, or input assembly, such as a power button 124, a switch or other actuator or device, to enable the user to turn the water flosser on or off. In one embodiment, the power button 124 (or other input device or assembly) may be located along an upper surface of the water flosser 100 and configured to be actuated by application of a downward force (e.g., a force that includes a force vector in a direction towards a supporting surface or a bottom surface of the base as indicated by directional arrow 126). Stated another way, the power button 124 (or other input device) may be positioned above the base 102 and require a force to be applied in the direction of the base 102 in order to effect actuation of the power button 124. In some embodiments, the power button 124 may be substantially coplanar with the lid 106. In the embodiment shown in FIGS. 1-4, the power button 124 is housed in a housing portion referred to as a riser 130 or upright post. The riser 130 may extend upwards from the base 102 and terminate adjacent the lid 106. The upper surface of the power button 124, the riser 130, and the lid 106 may be coextensive with one another and cooperatively define the upper surface of the water flosser 100. As shown in FIG. 4, the riser 130 may be positioned at a location that is external to the inner cavity 111 of the reservoir 104. While the riser 130 may exhibit an upper surface that substantially co-extends with the upper surface of the lid 106, in other embodiments the riser 130 may extend to a height that is higher than or lower than the upper surface of the lid 106. The positioning of the upper surface of riser 130 allows a user to easily activate the button or input device while using the water flosser 100.

Figure 5:
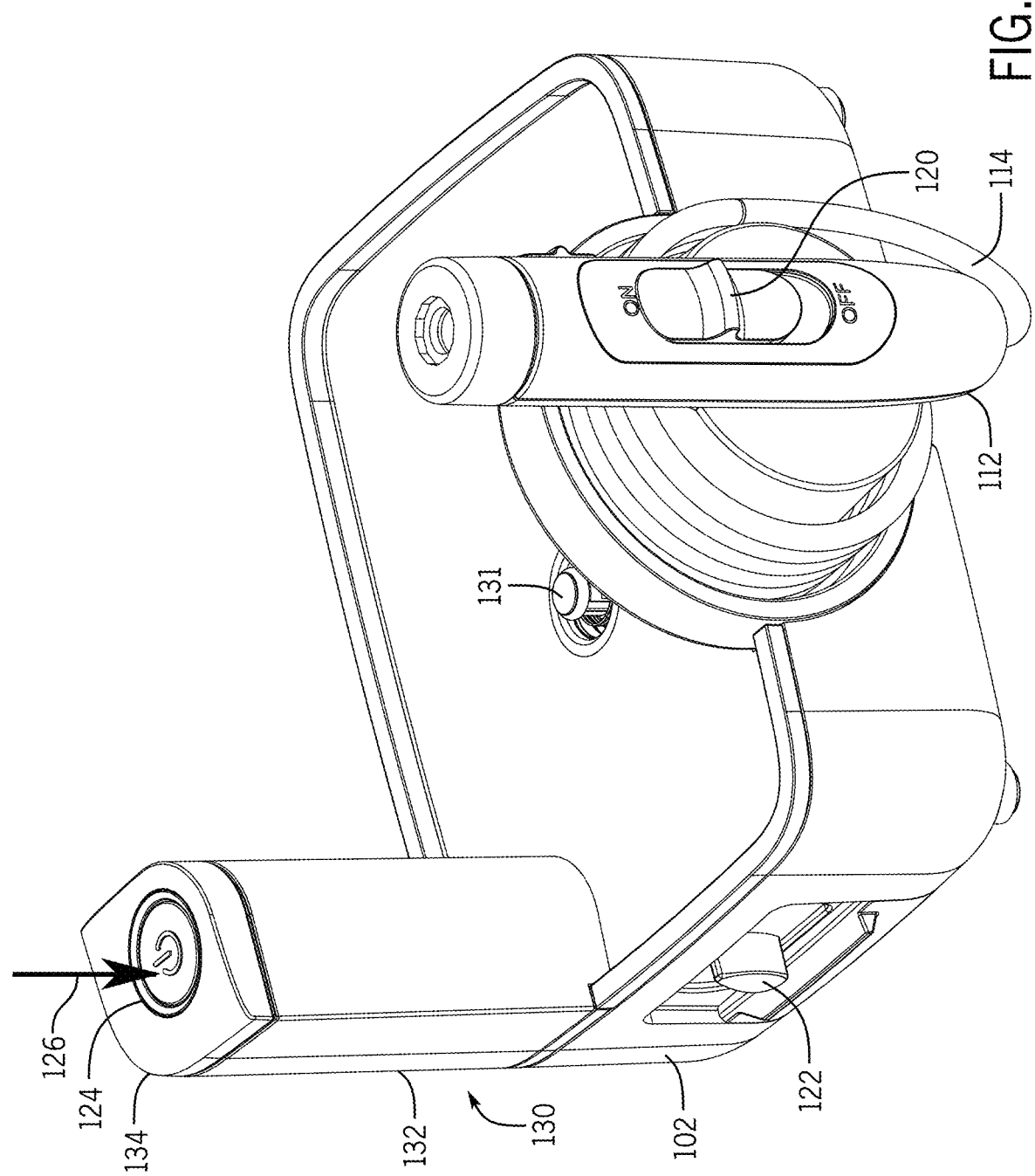
FIG. 5 is a front perspective view of water flosser shown in FIG. 1 with the lid and reservoir removed.

Referring to FIG. 5, the water flosser 100 is shown with the lid 106 and reservoir 104 removed, showing a reservoir outlet 131 coupled to the pump (or associated valving) through which fluid flows form the reservoir 104 to the pump. FIG. 5 shows the riser 130 as an independent component or structure relative to the reservoir 104. The riser 130 may include an upward extending housing portion 132. The power button 124 may be coupled to the upward extending housing portion 132. For example, the power button may be coupled to an upper end of the upward extending housing portion 132. In some embodiments, the power button 124 may be received within the upper end of the upward extending housing portion 132.

The riser 130 may include a cap 134 coupled to the upward extending housing portion 132. The power button 124 may be positioned within the cap 134. For example, the power button 124 may be surrounded by the cap 134 and in some instances two or more sidewalls of the cap 134 may abut against sidewalls of the lid 106. The power button 124 or input assembly may include a glyph 136 and/or a light ring 138. In some embodiments, the glyph 136 and/or the power button 124 may be surrounded by the light ring 138. The glyph 136 and light ring 138 may light up, for example, when the power button 124 has been actuated. In other embodiments, the glyph 136 and light ring 138 may change the color of light (e.g., from red to green) when the power button 124 has been actuated. In other embodiments, the glyph 136 and/or light ring 138 may change colors, or be lighted in a flashing pattern (e.g., slow blinking, fast blinking, number of blinks) to indicate a particular status of the water flosser 100. In some embodiments, only the light ring 138 may be lighted and the glyph 136 may comprise an unlit symbol.

Figure 6:
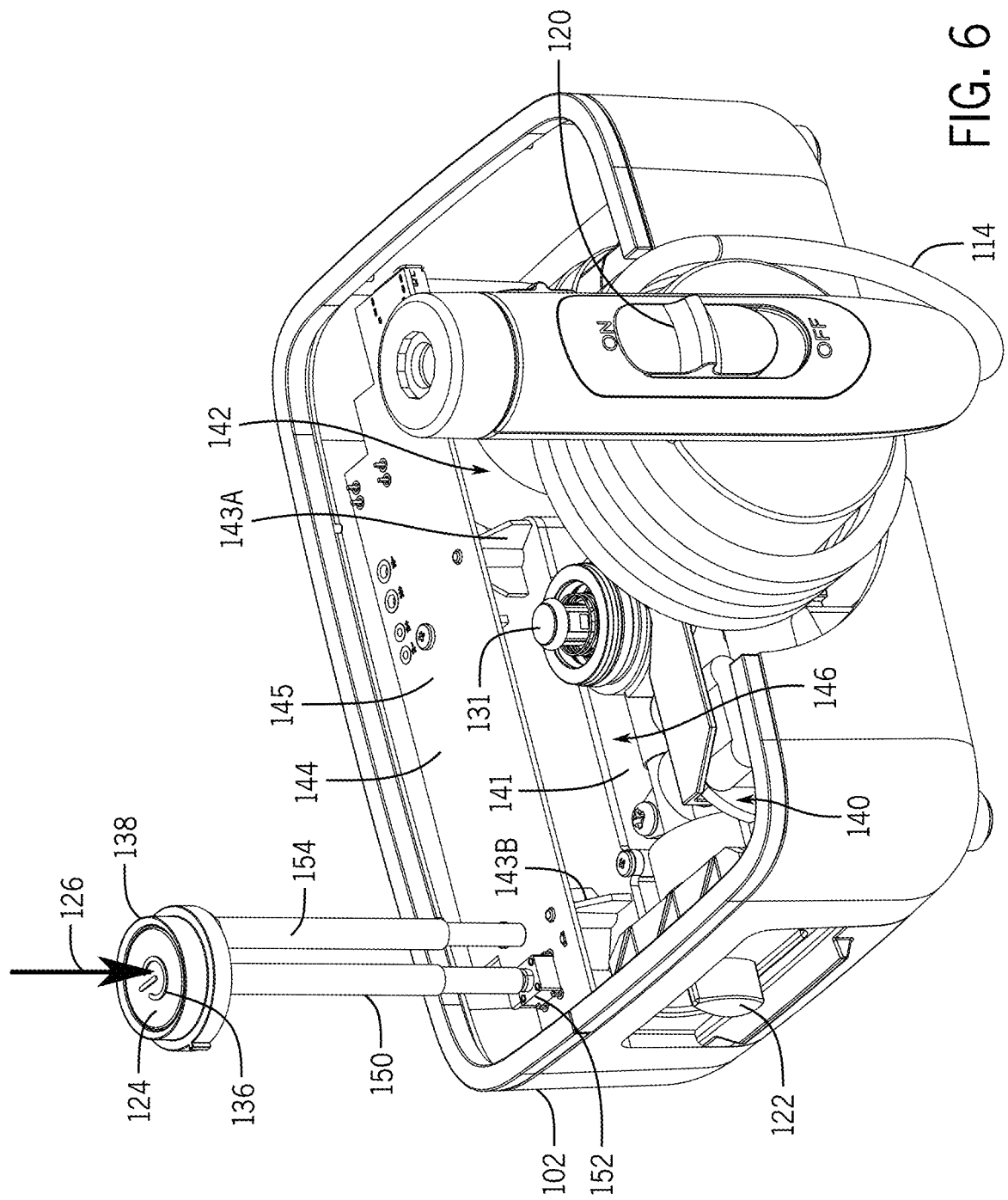
FIG. 6 is a front perspective view of water flosser shown as shown FIG. 5 with additional housing portions removed.
Figure 16:
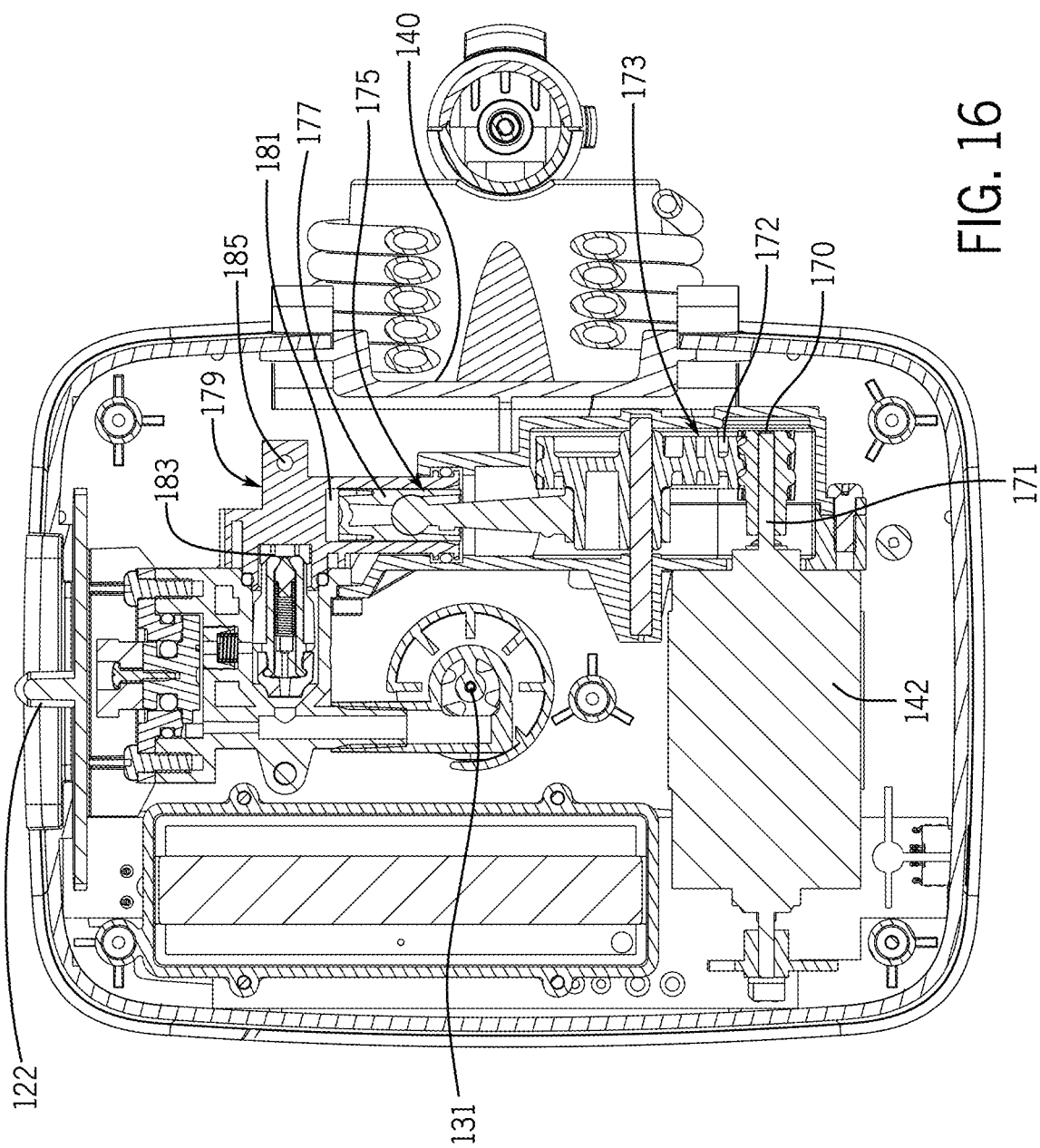
FIG. 16 is a cross-sectional view of the water flosser taken along line 16-16 in FIG. 3.

Referring to FIG. 6, the water flosser 100 is shown having various components removed (e.g., the reservoir 104, lid 106, upper portion of the base 102, housing portion 132 and cap 134 of the riser 130) to reveal various internal components. FIG. 16 is a cross-section of the water flosser taken along line 16-16 in FIG. 3. With reference to FIGS. 6 and 16, internal components that may be housed within an interior housing compartment or base compartment may include a pump 140 coupled with the reservoir outlet 131, a motor 142 configured to drive the pump 140, an electronics carrier 144 (e.g., printed circuit board (PCB) or circuit board) in electrical communication with the motor 142, a battery 146 in electrical communication with the PCB 144 and providing power to the various components including the motor 142. The PCB 144 may include an integrated circuit device (IC) or other processing element that serves as a controller for the operating of various components of the water flosser 100.

In some embodiments, the PCB 144 or electronics carrier is configured to extend across a width of the base 102 or housing and be oriented such that a top surface and a bottom surface of the PCB 144 extends parallel to a bottom interior surface 141 of the base 102. Additionally, mounting structures 143a, 143b may be positioned below the PCB 144 to secure it to the base 102, as well as elevate the PCB 144 above the bottom interior surface 141. Alternatively, the PCB 144 may be mounted to sidewalls or other components within the base 102. The elevation or separation distance between the bottom interior surface 141 of the base 102 and the PCB 144 helps to ensure that electronic components (e.g., LEDs, sensors, controller, etc.) mounted to the PCB 144 are not damaged in the event liquid (e.g., water) enters into the base 102. The raised configuration of the PCB 144 allows electronic components to be positioned on both the top and bottom surfaces of the PCB 144. For example, a light source may be mounted on a top surface 145 of the PCB 144 in order to be able to direct light into the light pipe 154 without obstruction, and the sensor or sensing device 180 may be mounted to a bottom surface 147 in order to be in optical communication with the encoder 178 (see FIG. 10). In these instances, the PCB 144 may be positioned over a portion of at least one of the motor 142 and/or battery 146 so as to partially cover portions of the battery 146 or the motor 142, helping to reduce the form factor for the base 102 that would otherwise be required without the overlapping or layering of components.

In some embodiments, the battery 146 may be a rechargeable battery configured to be charged through a USB connection or other appropriate connection 148 (see FIGS. 9 and 10) associated with the PCB 144. In other embodiments, the battery 146 may be one or more consumer replaceable batteries such as, for example, AAA, AA, C, D or 9 volt batteries. In yet other embodiments, a different power source may be used in place of a battery, e.g., wired power source.

Still referring to FIG. 6, with the housing portion 132 and cap 134 of the riser 130 removed, a push rod 150 can be seen extending between the power button 124 and a switch 152. The switch may be electrically and physically coupled with the PCB 144. Thus, when a force is applied to the power button 124 (or other input device) in the direction of directional arrow 126, the force is transferred from the power button 124, through the push rod 150 and to the switch 152 to actuate the switch 152.

In some embodiments a light pipe 154 may be positioned adjacent the push rod 150 and extend between the PCB 144 and the power button 124. The light pipe 154 may be configured to either act as a light source or to direct light from a light source on the PCB 144 to the light ring 138, the glyph 136, or both.

In other embodiments, in place of the push rod 150, electrical connections (e.g., wires or traces) may extend from the PCB 144 to the power button 124 and a switch may be housed within the power button 124. Similarly, a light source may be housed within the power button 124 and provide light to the light ring 138, the glyph 136 or both in place of a light pipe 154.

Figure 7:
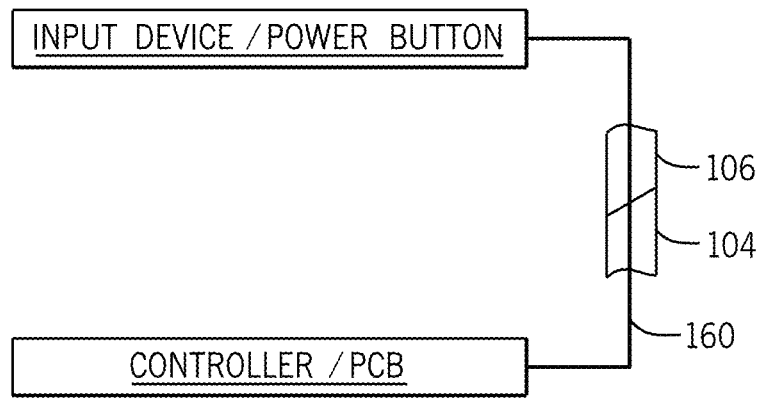
FIG. 7 is a schematic showing an arrangement including an input device according to an embodiment of the present disclosure.

Referring briefly to FIG. 7, a schematic shows power button 124 (or other input device) in communication with a controller (e.g., the PCB 144) in accordance with another embodiment of the present disclosure. The power button 124 may include a switch that may be electrically coupled with the PCB 144 by way of conductive wires or traces 160. In one embodiment, the traces may be formed in or extend through a portion of the reservoir 104, the lid 106, or both. For example, conductive traces may be molded into the walls of the reservoir 104 and coupled with additional conductive traces molded into the lid 106.

Figure 8:
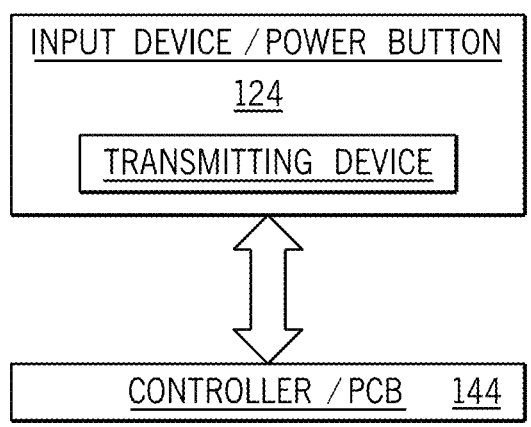
FIG. 8 is a schematic showing an arrangement including an input device according to another embodiment of the present disclosure.

FIG. 8 is another schematic illustrating power button 124 (or other input device) in communication with a controller (e.g., the PCB 144) in accordance with another embodiment of the present disclosure. The power button 124 may include a wireless transmitting device 162 that, when actuated, transmits a wireless signal to the controller such as by a Bluetooth® or other wireless protocol. Thus, in the examples described with respect to FIGS. 7 and 8, the power button 124 may be located at any of a variety of locations on the top surface (e.g., the lid 106), still provide proper input to the PCB 144 and still enable a user to actuate the input device by applying a force in a downward direction toward the base 102 and toward a supporting surface beneath the base 102. In such embodiments, the water flosser 100 may or may not include a riser 130 such as described hereinabove.

The use of a power button 124 (or other input device) requiring a downward force vector for actuation, regardless of location of the button, may provide various advantages. For example, such a configuration enables actuation of the power button 124 without causing the water flosser 100 to slide across a supporting surface. Thus, for example, if a power button or other input device required a force to be applied in a direction that was parallel to the plane of a supporting surface, in some cases the applied force may be sufficient to tip over the water flosser 100 or slide the water flosser 100 along the supporting surface by overcoming any frictional resistance existing between the feet of the base 102 and the supporting surface. The sideways displacement of the water flosser 100 could cause a variety of issues including pushing the water flosser 100 off of the supporting surface, spilling of water in the reservoir 104, collision of the water flosser 100 with other items on the supporting surface, and an inability to actuate the input device (e.g., the power button 124) with a single hand (e.g., a second hand may be required to resist movement of the water flosser 100 relative to the supporting surface). Further, placing the power button 124 or other input device at or near the top of the reservoir 104, whether positioned in or adjacent to the lid 108, provides various advantages including ease of access to the power button 124 for a user. For example, the power button 124 may be seen and easily located from above while a user is leaning over a sink and using the water flosser 100 regardless of whether the water flosser 100 is positioned to their left or to their right.

Figure 9:
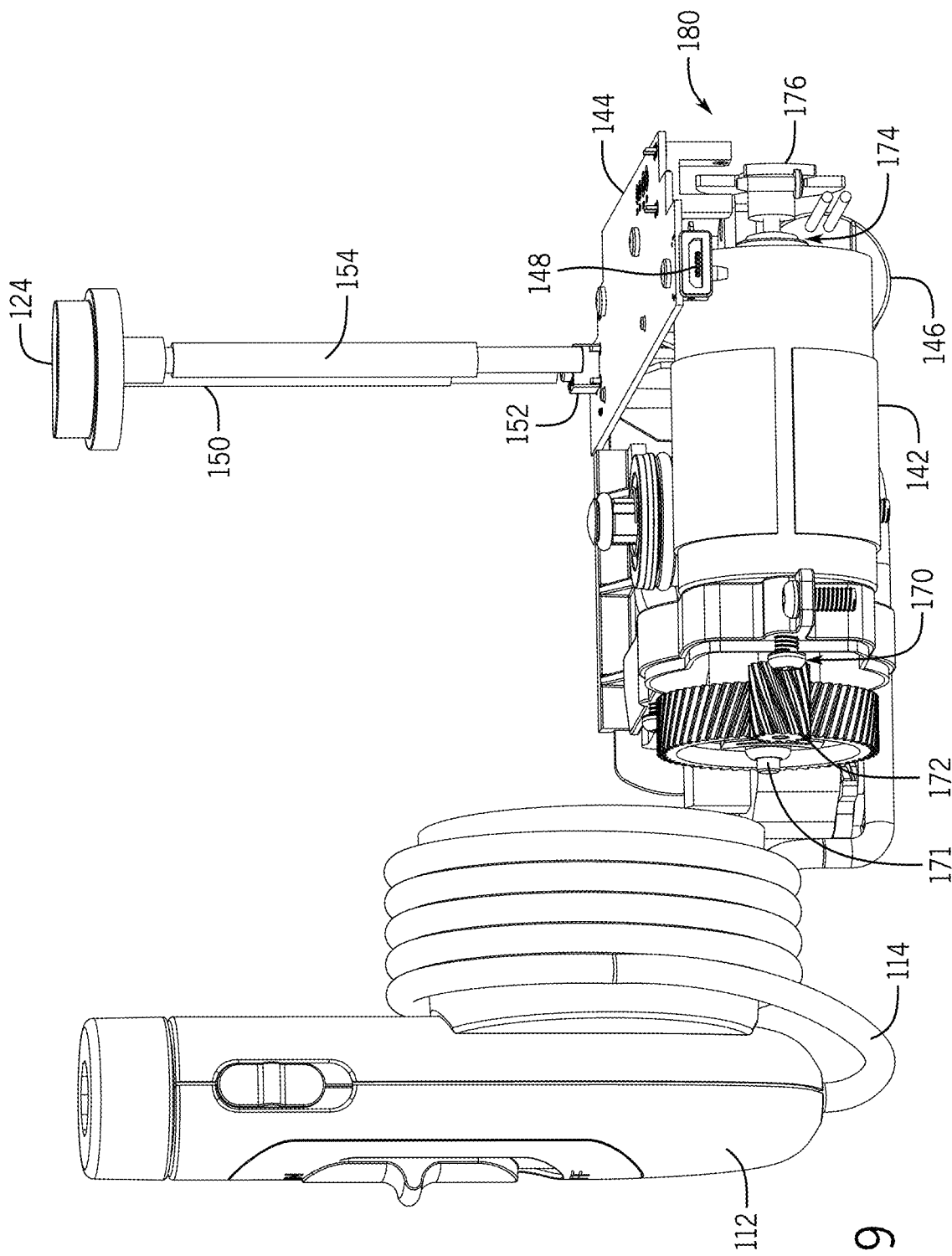
FIG. 9 is a right side perspective of the water flosser shown in FIG. 1 with the lid, reservoir and many of the housing components removed, revealing various internal components of the water flosser.
Figure 10:
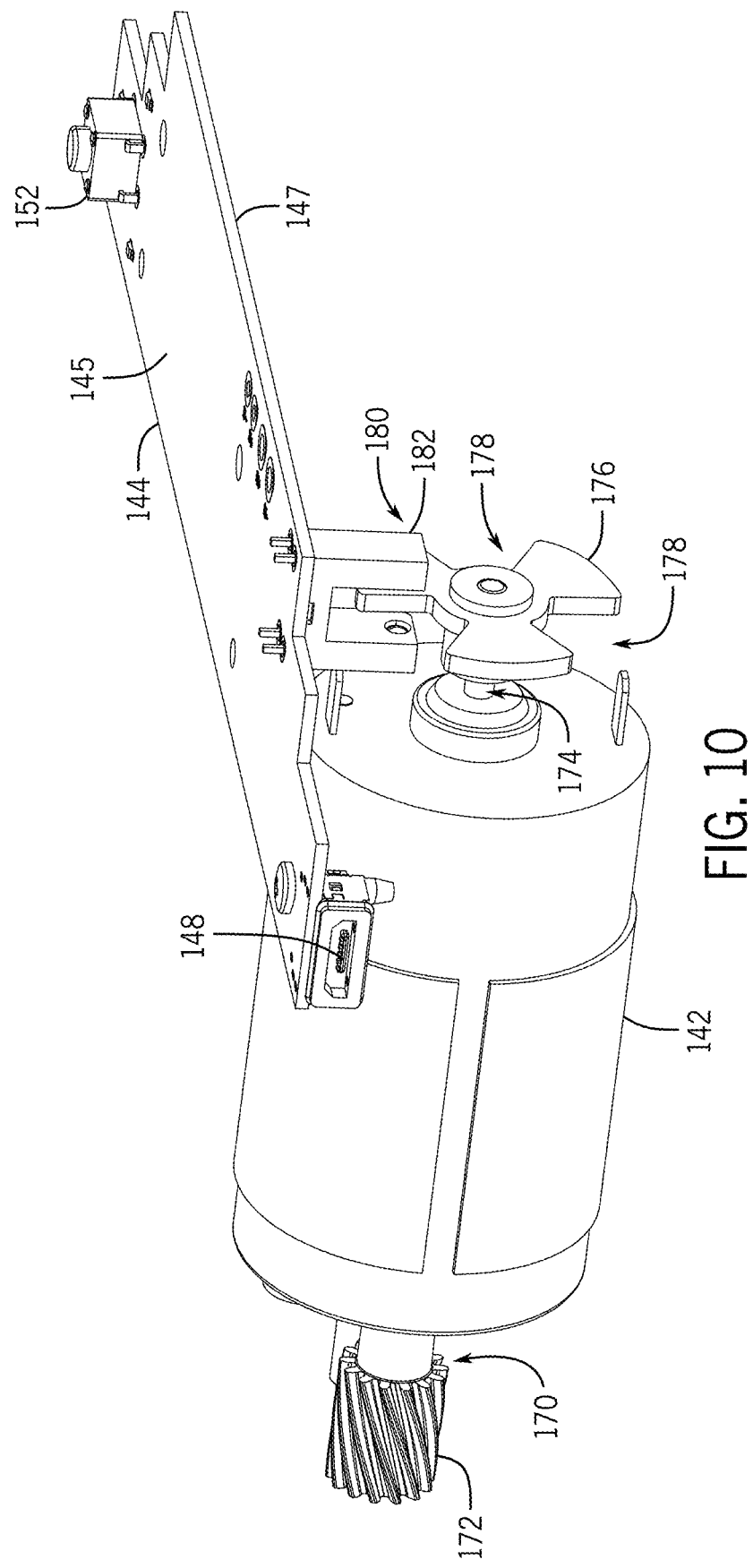
FIG. 10 is a perspective view of a motor and PCB of the water flosser shown in FIG. 1.

Referring now to FIGS. 9 and 10, another aspect of a water flosser 100 is described. FIG. 9 shows the inner components of the water flosser 100 including the motor 142 and the PCB 144. The motor 142 may include dual outputs or otherwise be configured to provide feedback for the controller. For example, the motor 142 may include separate output shafts, or may include a single shaft extending out opposing ends of the motor 142. The dual outputs may include a first shaft end 170 that is coupled with a gear 172 to drive the pump 140 and a second shaft end 174 associated with a sensing device configured to determine an operational parameter of the motor (e.g., speed or torque). In one embodiment, the second shaft end 174 may be coupled with a rotary encoder disc 176. The rotary encoder disc 176 may have defined number of openings or cut-outs 178. In the embodiment shown in FIGS. 9 and 10, three cut-outs 178 are shown, but fewer or more of such cut-outs are contemplated as being used in other embodiments.

In the illustrated embodiment, a sensing device or sensor 180 is positioned adjacent the rotary encoding disc 176 and may include a transmitter 182 positioned adjacent one side of the rotary encoder disc 176 and a receiver 184 positioned adjacent an opposing side of the rotary encoder disc 176. As shown in FIG. 10, the sensor 180 may extend from the bottom surface 147 of the PCB 144 and, with the elevation of the PCB 144, is positioned over the motor 142 and the rotary encoder disc 176 so as to be in optical communication or otherwise visibly aligned with the disc 176. As the rotary encoder disc 176 is rotated by the motor 142, transmissions from the transmitter 182 are alternately blocked (by solid portions of the rotary encoder disc 176) and allowed to pass to the receiver 184 (when the cut-outs 178 are aligned with the transmission path). The frequency of the pulsed signal detected by the receiver 184 may be used to determine the speed of the motor 142 and, thus, output parameters of the pump 140. With the speed of the motor 142 having been detected, the motor speed may be further controlled by a controller (which may include an integrated circuit associated with the PCB 144) by, for example, pulse width modulation (PWM), see e.g., the method 300 in FIG. 17. The controller may keep the motor speed constant and at a desired value regardless of the charge state of the battery (i.e., battery voltage), the pressure setting of the pump 140 component tolerances or other manufacturing variables that might otherwise affect the operation of the motor 142. Use of the sensing device 180 with the rotary encoding disc 176 may fulfill a safety function by detecting a stalled motor (i.e., a rotational speed of zero when the motor is still drawing current from the battery or other power source). When this state is detected, the controller can turn off the power to the motor 142, preventing overheating of the motor 142.

In one embodiment the transmitter 182 may be configured as a light emitter (e.g., a light emitting diode or an infrared transmitter) and the receiver 184 may include a photo sensor configured to detect the transmission of light. Thus, the rotary encoder disc 176 and sensing device 180 may be configured as a photo interrupter. In other embodiments, rather than using a disc with cut-outs, a disc with reflecting portions may be used and the transmitting and receiving elements may be positioned on a common side of the rotating disc. In yet other embodiments, other types of sensors may be employed including, for example, magnetic encoders (utilizing magnets and Hall sensors) or inductive encoders.

Figure 11:
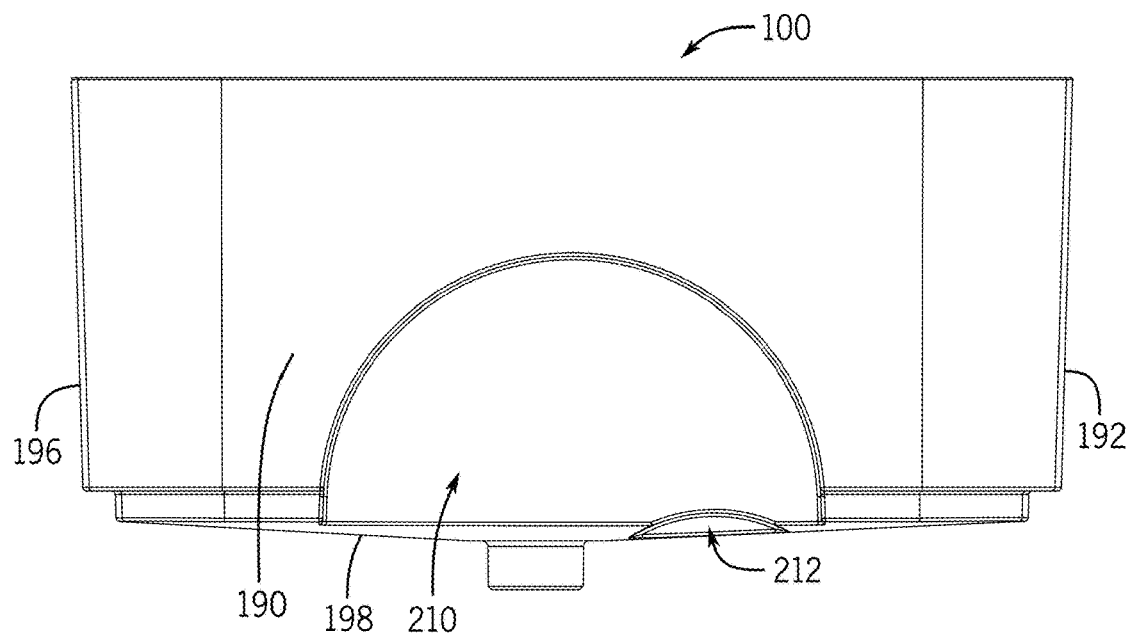
FIG. 11 is a front view of a reservoir of a water flosser in accordance with an embodiment of the present disclosure.
Figure 12:
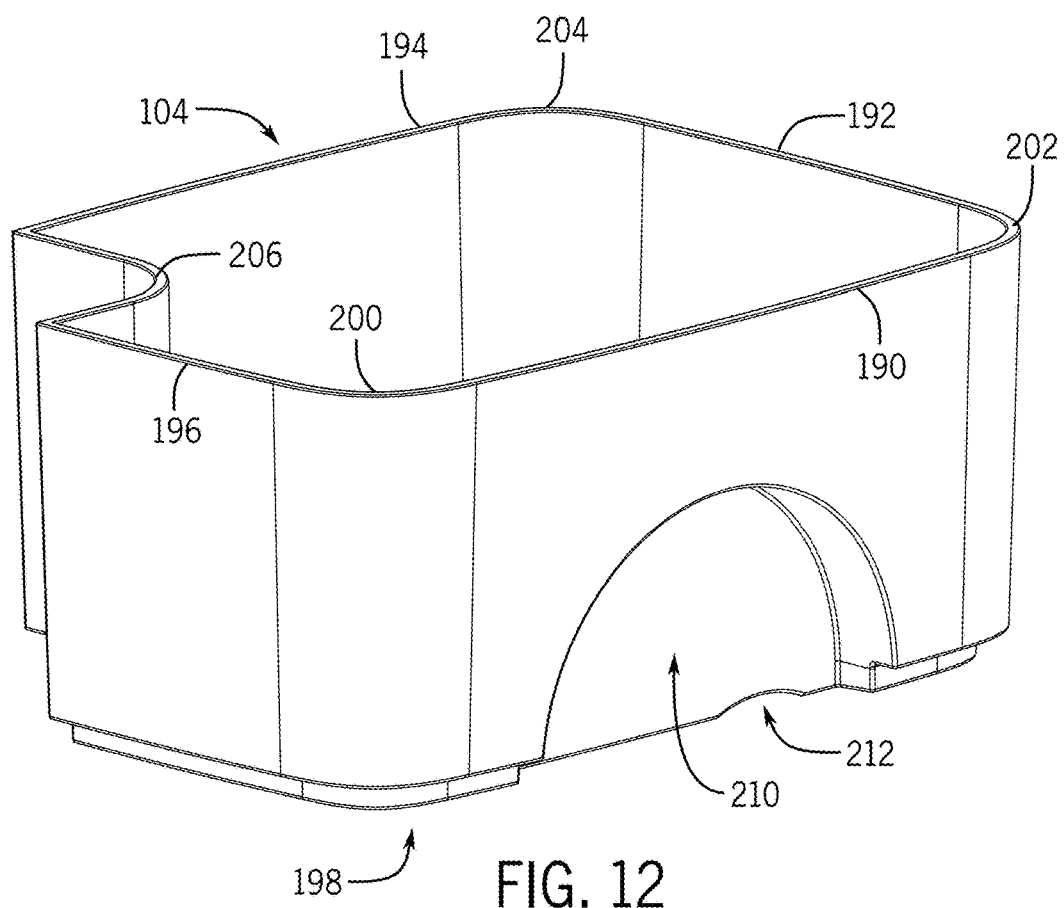
FIG. 12 is a perspective view of the reservoir shown in FIG. 11.
Figure 13:
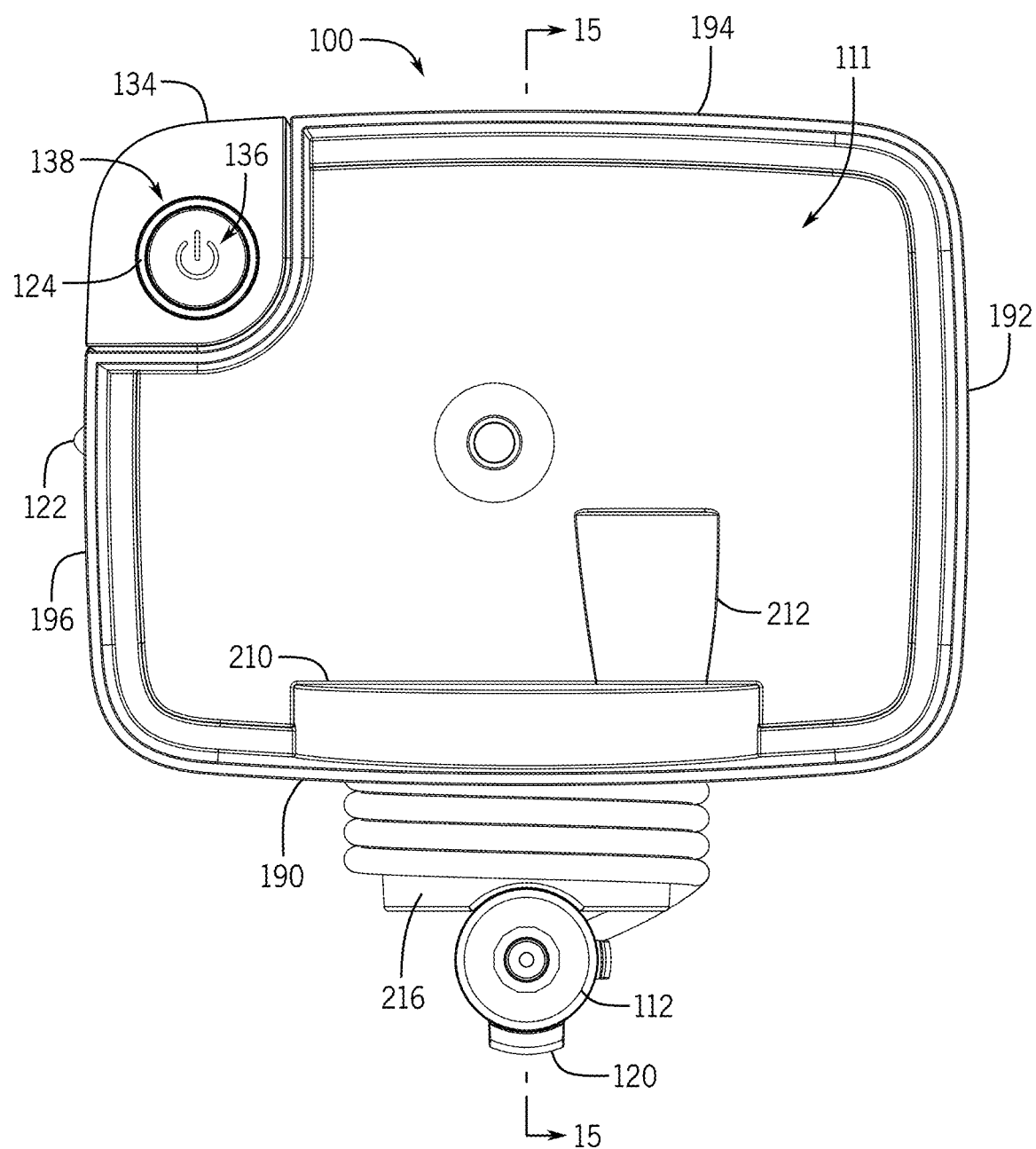
FIG. 13 is a top view of the water flosser shown in FIG. 1 with the lid removed.
Figure 14:
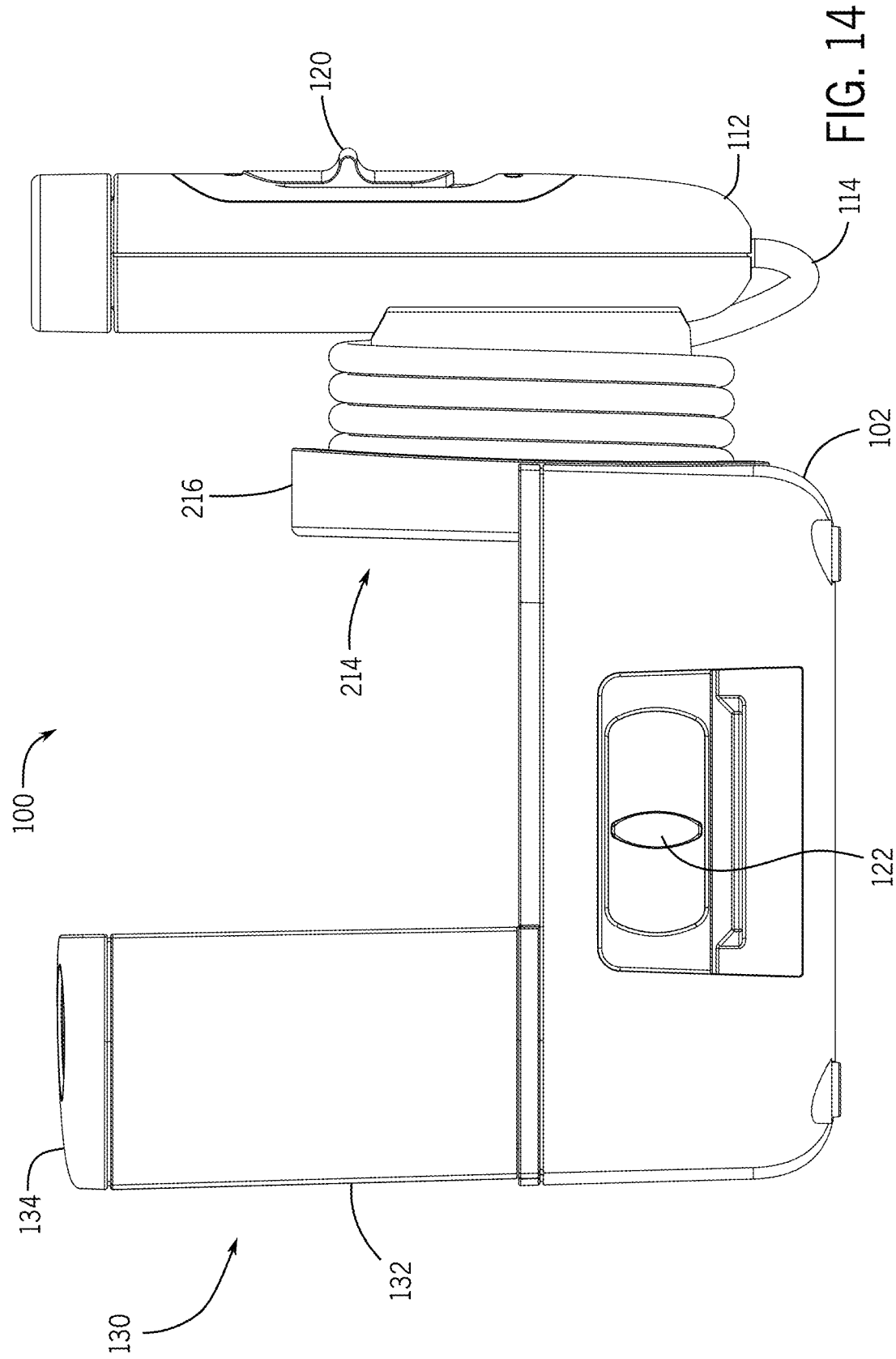
FIG. 14 is a side view of the water flosser shown in FIG. 1 with the lid and reservoir removed.
Figure 15:
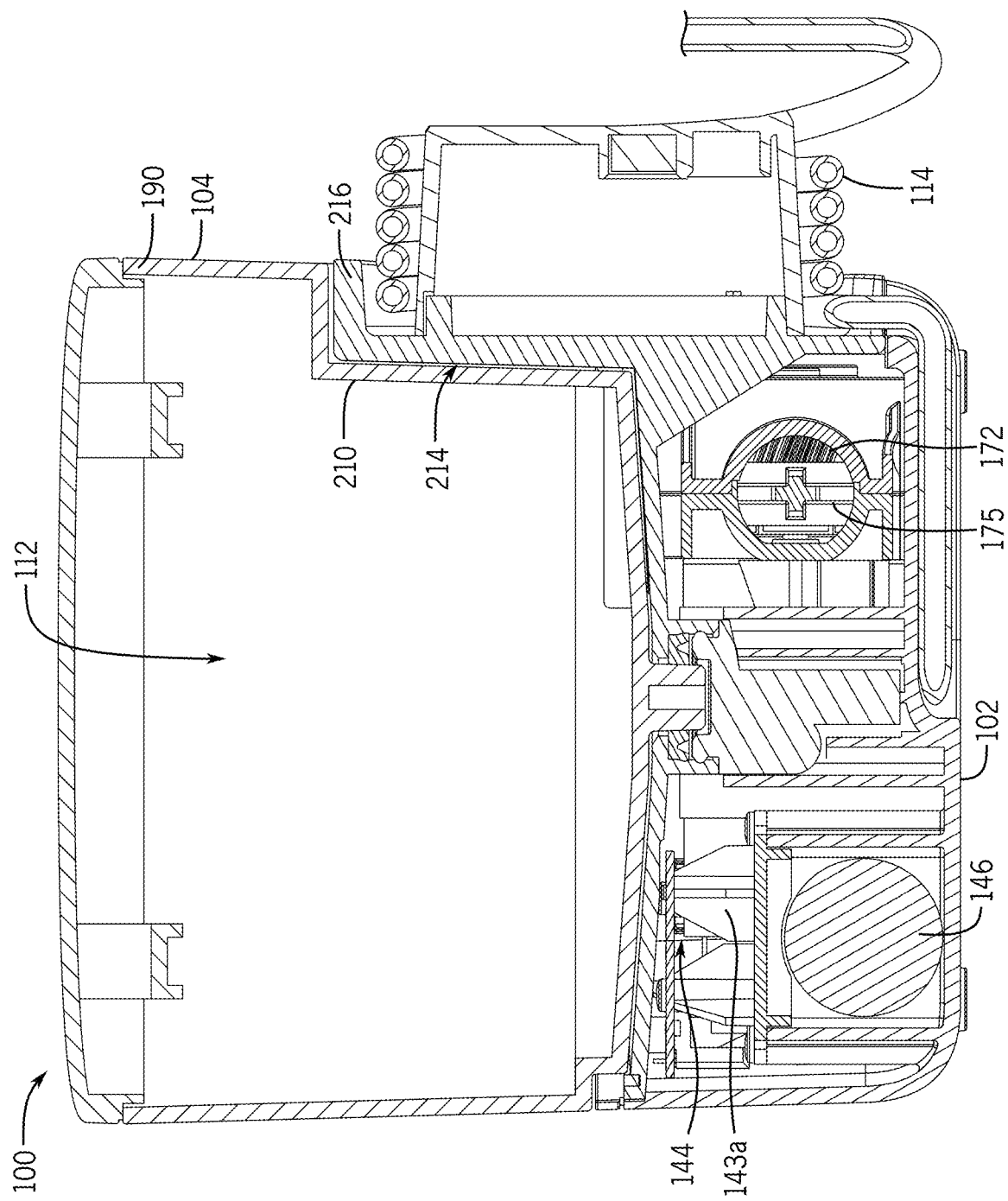
FIG. 15 is a cross-sectional view of the water flosser as taken along lines 15-15 as shown in FIG. 13.

Referring now to FIGS. 11-15, another aspect of a water flosser 100 is described in accordance with an embodiment of the present disclosure. FIG. 11 is front view of the reservoir 104 and FIG. 12 is a perspective view of the reservoir 104. FIG. 13 is a top view of the water flosser 100 with the lid 106 removed, and FIG. 14 is a side view of the water flosser 100 with the lid 106 and reservoir 104 removed. FIG. 15 is a partial cross-sectional view of the water flosser 100 taken along line 15-15 as shown in FIG. 13.

The reservoir 104 may include a first wall 190, a second wall 192, a third wall 194, a fourth wall 196 and a floor 198 configured to provide a fluid tight inner cavity 111. Considering the internal surface of the reservoir 104 that defines the inner cavity 111, the internal surfaces of the walls 190, 192, 194 and 196 may be joined together to define three concave corners 200, 202, 204 and one convex corner 206. The convex corner 206 is sized and shaped to matingly engage the riser 130. As previously discussed, in other embodiments, a riser may extend upward through the inner cavity 111 of the reservoir 104. In such a case, all four inner corners of the reservoir 104 may all be configured as concave corners. Of course, other designs and configurations may be implemented with the riser being placed at other locations.

The reservoir 104 may include a first recess 210 for receiving a portion of a hose support structure 216 that provides storage for the hose 114. The first recess 210 may be formed within the first wall 190 of the reservoir 104 and may be located between two of the corners (e.g., between corners 200 and 202), and may be sized, shaped and located to matingly receive the inner wall 214 of a hose support structure 216. The positioning of the hose support structure 216 in the first recess 210 of the reservoir 104 enables the water flosser 100 to have a smaller footprint and to alter the center of gravity of the water flosser 100. This makes the water flosser 100 more user friendly and more stable when placed on a supporting surface.

The reservoir 104 may include a second recess 212 formed in the floor 198 of the reservoir 104. The second recess 212 may accommodate one more of the components located within the base 102. For example, the second recess 202 may accommodate the positioning of the pump 140 or one or more gear members coupling the pump 140 and the motor 142, thereby reducing the height of the water flosser 100 to provide a more stable water flosser.

With reference to FIG. 16, the water flosser 100 may define a compact form factor, resulting in the water flosser 100 being more portable and occupying less space on a support surface, such as a user's countertop, than traditional countertop water flossers. For example, as previously mentioned, the PCB 144 may be oriented horizontally across a width of the base 102 with certain components mounted beneath the PCB 144 to reduce the width of the base 102. As another example, the pump 140, which may include a connecting rod 175, a piston 177, and a pump body 179, may be configured to have a reduced form factor with orthogonally oriented fluid connections and pathways. In particular, the pump body 179 may define a pump chamber 181 that is orthogonal to a pump inlet 183 and to a pump outlet 185. Stated another way, the pump inlet 183 may be positioned at a right angle relative to the piston chamber 181 or chamber inlet, and the piston chamber 181 may be positioned at a right angle relative to the pump outlet 185. It should be noted that in some instances the pump body 179 may be formed of a single component or may include multiple components coupled together, e.g., pump valve housings connected to or defining a part of the inlets and outlets of the pump body.

The pump outlet 185 may direct fluid exiting the pump downwards away from the reservoir and through a bottom surface of the base 102. As an example, a hose connector fluidly connected to the hose 114 may be coupled to a bottom of the pump body 179 and extend out of the bottom interior surface 141 of the base 102. The pump outlet 185 may include an aperture that directs the fluid vertically downwards into the hose connector to be delivered to the hose 114.

Figure 17:
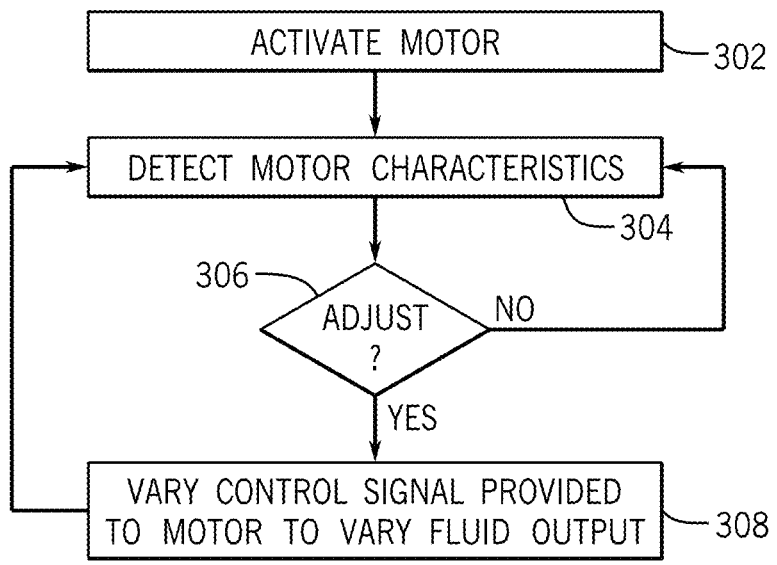
FIG. 17 is a flow chart of a method for controlling the pump based on feedback from the motor.

FIG. 17 illustrates a method 300 for controlling the output of the water flosser. The method 300 may begin with operation 302 in which the motor 142 is activated. For example, a user may compress the input device (e.g., the power button 124) to change a state of the switch 152 on the PCB 144, resulting in the switch 152 providing power (e.g., via the controller) from the battery to the motor 142. The motor 142 rotates an output shaft 171, which in in turn drives a linkage 173 (e.g., gears 172), to activate the pump 140. As the piston 177 is driven in a first direction by the connecting rod 175, the pump 140 generates a vacuum force to pull fluid from the reservoir 104 into the pump body 179, e.g., via pump inlet 183. The fluid then enters the pump chamber or piston chamber 181. Then, as the piston 177 is driven in a second direction by the connecting rod 175, the pump 140 generates a pushing force that pumps the fluid in the piston chamber 181 towards the pump outlet 185, which delivers the fluid to the handle, such as from a hose connector that connects to the pump body 179 and fluidly connects the pump outlet 185 to the hose.

Once the motor 142 is activated, the method 300 proceeds to operation 304 in which the controller detects motor characteristics. As the motor 142 drives the pump 140, the sensing device 180 tracks the output motion of the motor. For example, the sensing device 180 may be configured to detect a rotational speed of the rotary encoder disc 176 that may be connected to the output shaft of the motor 142. Using the detected rotational speed of the rotary encoder disc 176, a processing element, e.g., the controller or processor, can determine the output characteristics of the pump 140, including flow rate, force, pulse rate, and the like.

In operation 306, the controller determines whether the pump characteristics should be adjusted. For example, in embodiments where the water flosser includes a battery 146, the current output to the motor 142 may decrease as the battery 146 is drained. The reduction in current may cause the motor 142 to drive the pump 140 at a slower speed or with less power, which can cause a reduction in effectiveness for the water flosser. As such, the controller may compare the actual output speed of the motor 142 with a desired output speed to determine whether the speed is above or below a desired level or range.

If, in operation 306, the motor 142 speed is determined to be at a desired level or range, the method 300 may return to operation 304 and the sensing device 180 may continue to monitor the motor 142 characteristics. If, in operation 306, the controller determines that the output speed is outside of a desired range (e.g., above/below a threshold), the method 300 proceeds to operation 308. In operation 308, the controller varies the control signal provided to the motor 142. For example, the controller may vary the magnitude, on time, frequency, or other characteristics of a control signal provided to the motor 142. After the control signal has been updated, the method 300 may return to operation 304 and the system may continue to monitor the output performance of the motor 142 and pump 140 while the water flosser is activated. As can be understood, once the water flosser has been turned off, the method 300 may end.

The feedback loop of the method 300 allows the water flosser to continue to maintain performance standards, even as the power input to the motor changes over time (e.g., due to a drained battery or battery degradation over time). In this manner, the performance of the pump 140 is able to be tracked and controlled by feedback and maintained over time to a desired level or range.

The foregoing description has broad application and the discussion of any example is meant only to be exemplary and is not intended to suggest that the scope of the disclosure, including the claims, is limited to these examples. It is also noted that features, components or aspects of one embodiment may be combined with features, components or aspects of other embodiments without limitation. Although embodiments of the present disclosure have been described with reference to specific examples, persons skilled in the art will recognize that changes may be made in form and detail without departing from the spirit and scope of the disclosure.

What is claimed is:

1. A water flosser comprising:
   a base;
   a reservoir positioned over the base;
   a lid positioned over the reservoir; and
   an input device positioned adjacent to the reservoir, the input device being configured to be actuated upon application of a force in a downward direction towards the base, and the input device comprising;
   a light ring surrounding a power button;
   a light source positioned within the base and below the light ring; and
   a light pipe extending from the light ring to the light source to illuminate the light ring independent from the power button.

2. The water flosser of claim 1, further comprising a push rod connected to the power button and extending vertically into the base from the power button.

3. The water flosser of claim 2, wherein the push rod is positioned adjacent to and parallel with the light pipe.

4. The water flosser of claim 2, further comprising a printed circuit board (PCB) and a switch positioned on the PCB, the switch being actuatable via depression of the power button and the push rod.

5. The water flosser of claim 1, wherein the power button comprises a wireless transmitting device that, when actuated, transmits a wireless signal.

6. The water flosser claim 1, wherein the input device is associated with a housing portion located adjacent the reservoir.

7. The water flosser of claim 6, wherein the reservoir defines an interior cavity having first, second, third and fourth interior corners, wherein the first, second and third interior corners are concave, wherein the fourth interior corner is convex, and wherein the housing portion is positioned adjacent the fourth corner.

8. The water flosser of claim 1, further comprising at least one of a push rod, a conductive trace, or a wireless transmitting device coupled with the input device and a controller disposed in the base.

9. The water flosser of claim 1, further comprising:
   a handle in fluid communication with the reservoir;
   a hose in fluid communication with the handle; and
   a hose support structure associated with the base and extending into a recess formed in a wall of the reservoir.

10. The water flosser of claim 1, further comprising:
    a pump disposed in the base and in fluid communication with the reservoir; and
    a motor disposed in the base and including a dual output shaft having a first shaft end coupled with the pump and a second shaft end coupled with a sensor configured to determine a rotational speed of the motor.

11. The water flosser of claim 1, further comprising:
    a piston; and
    a pump body disposed in the base, the pump body comprising:
      a fluid inlet in fluid communication with the reservoir;
      a fluid outlet in fluid communication with the fluid inlet; and
      a piston chamber in fluid communication with the fluid inlet and the fluid outlet;
    wherein:
      the piston is at least partially received within and moves relative to the piston chamber; and
      the piston chamber, the fluid inlet, and the fluid outlet are all oriented orthogonal to one another.

12. The water flosser of claim 1, further comprising:
    an electronics carrier disposed in the base;
    a light emitting diode mounted to a top surface of the electronics carrier for emitting light to the input device; and
    a sensor mounted to a bottom surface of the electronics carrier for detecting an output speed of a motor disposed in the base.

13. A method of controlling power to a water flosser, the method comprising:
    locating a power button associated with a lid of the water flosser; and
    pressing downward on the power button to actuate the power button, wherein:
      a light ring element surrounds the power button;
      a light source is configured to illuminate the light ring element via a light pipe separate from the power button.

14. The method of claim 13, wherein the power button is coplanar with the lid.

15. The method of claim 13, wherein the power button is located adjacent to the lid.

16. A water flosser comprising:
    a base;
    a reservoir positioned over the base;
    an input device positioned adjacent to the reservoir, the input device comprising:
      a power button actuatable in response to a downward force towards the base;
      a light ring element surrounding the power button; and
      a single light source positioned within the base and below the light ring element, the single light source configured to illuminate the light ring element via a light pipe separate from the power button;
    a handle in fluid communication with the reservoir;
    a pump disposed in the base and in fluid communication with the reservoir and the handle; and
    a motor disposed in the base and including a dual output shaft having a first shaft end coupled with the pump and a second shaft end coupled with a sensing device configured to determine a rotational speed of the motor.

17. The water flosser of claim 16, wherein the sensing device includes a rotary encoder disc coupled with the second shaft end.

18. The water flosser of claim 17, wherein the rotary encoder disc defines a plurality of cutouts, and wherein the water flosser further comprises a transmitter positioned on a first side of the rotary encoder disc and a receiver positioned on a second side of the rotary encoder disc.

19. The water flosser of claim 18, wherein the transmitter includes a light emitter and wherein the receiver includes a photo sensor.

20. A water flosser comprising:
   a base;
   a reservoir positioned over the base;
   an input device positioned adjacent to the reservoir, the input device comprising:
      a power button actuatable towards the base;
      a light ring surrounding the power button; and
      a light source, wherein light is transmittable independent of the power button and directly from the light source to the light ring;
   a handle in fluid communication with the reservoir by way of a hose; and
   a hose support structure coupled with the base and extending into a recess formed in a wall of the reservoir.

\* \* \* \* \*